(12) United States Patent
Uehara

(10) Patent No.: US 6,320,684 B2
(45) Date of Patent: Nov. 20, 2001

(54) WDM OPTICAL TRANSMISSION SYSTEM

(75) Inventor: Daisuke Uehara, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/813,877

(22) Filed: Mar. 22, 2001

Related U.S. Application Data (62) Division of application No. 09/066,676, filed on Apr. 28, 1998.

(30) Foreign Application Priority Data

Apr. 30, 1997 (JP) .................................... 9-124770

(51) Int. Cl.$^7$ .................................... H04J 14/02
(52) U.S. Cl. .................. 359/124; 359/110; 359/128; 359/176; 359/177
(58) Field of Search ................... 359/124, 110, 359/128, 176, 177; 385/17

(56) References Cited

U.S. PATENT DOCUMENTS

| | | | |
|---|---|---|---|
| 5,457,556 | 10/1995 | Shiragaki | 359/128 |
| 5,754,320 | 5/1998 | Watanabe et al. | 359/128 |
| 5,867,289 | 2/1999 | Gerstel et al. | 359/128 |
| 5,959,767 | 9/1999 | Fatehi et al. | 359/128 |
| 6,061,482 | 5/2000 | Davis | 359/128 |
| 6,084,694 | 7/2000 | Milton et al. | 359/124 |
| 6,256,125 | * 7/2001 | Uehara | 359/124 |

FOREIGN PATENT DOCUMENTS

| | | |
|---|---|---|
| 4-77132 | 3/1992 | (JP) . |
| 6-37717 | 2/1994 | (JP) . |
| 6-164515 | 6/1994 | (JP) . |
| 8-186559 | 7/1996 | (JP) . |

* cited by examiner

*Primary Examiner*—Kinfe-Michael Negash
(74) *Attorney, Agent, or Firm*—McGuireWoods LLP (57) ABSTRACT

A wavelength division multiplexing (WDM) optical transmission system includes a node having a wavelength-demultiplexer, an optical switch connected to the demultiplexer, a regenerative repeater circuit connected to the switch, a controller, a monitor signal generator, and an output circuit. The demultiplexer receives a plurality of optical signals of different wavelengths and a first monitor signal having information indicative of bit rates of the optical signals. The controller identifies an optical signal which requires regenerative repeating based on the first monitor. The controller then outputs a first control signal to the switch for switching the optical signal into the regenerative repeater circuit. A second control signal is then output to the repeater circuit for controlling regenerative repeating based on the information indicative of the bit rate of the optical signal included in the first monitor signal. The monitor signal generator then generates a second monitor signal which includes information indicating bit rates of the optical signals including the repeated optical signal and the fact that one of the optical signals has been regeneratively repeated. The optical signal and second monitor signal are then output to another circuit which, for example, may be another node in the WDM transmission system.

7 Claims, 9 Drawing Sheets

WDM OPTICAL TRANSMISSION SYSTEM

This is a divisional of U.S. patent application Ser. No. 09/066,676, filed Apr. 28, 1998, the contents of which are incorporated by reference herein.

FIELD OF THE INVENTION

This invention relates to a WDM optical transmission system, and more particularly to, a WDM optical transmission system provided with means for monitoring and controlling wavelength components at each node.

BACKGROUND OF THE INVENTION

In wavelength division multiplexing (hereinafter also referred to as 'WDM') optical transmission systems, various network systems, e.g., a point-to-point system, an optical cross connect system and an optical ADM ring system, are constructed. Using already-installed transmission lines and equipment and the econimization of the networks into account, optical transmission systems of this type need to transmit optical signals with various bit rates, e.g., 600 Mb/s, 2.4 Gb/s, 10 Gb/s while wavelength-multiplexing them using the already-installed transmission lines and equipment.

In this case, each node conducts linear-repeating to the next-stage node regardless of the bit-rate difference. However, it is known that the maximum transmission repeating distance (linear repeating distance) is limited due to a loss, a dispersion etc. in transmission line and depends upon the bit rate.

Because of this, the conventional WDM optical transmission systems have been designed considering previously the bit rates and repeat numbers of wavelength components to be received by the respective nodes.

However, the transmission system that the bit rate and repeat number are previously designed and fixed may not be flexibly applicable to the change of bit rate etc. to be required by an increase in transmission capacity. Then, the cost performance, reliability etc. of the network must be reduced that much.

SUMMARY OF THE INVENTION

Accordingly, it is an object of the invention to provide a WDM optical transmission system in which the repeating transmission of all wavelength components can be performed regardless of the repeat number and bit rate.

According to the invention, a wavelength division multiplexing optical transmission system, comprises:

a wavelength-demultiplexing means for receiving a wavelength-multiplexed signal that a monitor-signal wavelength component is multiplexed to a plurality of main-signal wavelength components and demultiplexing the wavelength-multiplexed signal into wavelength components;

an optical switch for receiving the main-signal wavelength components demultiplexed by the wavelength-demultiplexing means and switching into either one of routes to output directly and to output through a bit-rate-selective type regenerator for each of the main-signal wavelength components;

the bit-rate-selective type regenerator for conducting the regenerative repeating to a signal input through the optical switch according to the bit rate and then returning it to the optical switch;

a monitor signal receiver for receiving and terminating the monitor-signal wavelength component demultiplexed by the wavelength-demultiplexing means;

a controller for detecting the bit rate and pass-through node number of each of the main-signal wavelength components by receiving a signal from the monitor signal receiver, generating a control signal to control the switching of the optical switch and the regenerative repeating of the bit-rate-selective type regenerator, and rewriting information to show the bit rate, pass-through node number and execution/non-execution of regenerative repeating of each of the main-signal wavelength components to be output to the next-stage node;

a monitor signal transmitter for receiving the information rewritten by the controller and generating a monitor-signal wavelength component; and a wavelength-multiplexing means for multiplexing the main-signal wavelength components output from the optical switch and the monitor-signal wavelength component output from the monitor signal transmitter.

According to another aspect of the invention, a point-to-point type wavelength division multiplexing optical transmission system, comprises:

a wavelength-demultiplexing means for receiving a wavelength-multiplexed signal that a monitor-signal wavelength component is multiplexed to a plurality of main-signal wavelength components and demultiplexing the wavelength-multiplexed signal into wavelength components;

an optical switch for switching a wavelength component to need the regenerative repeating of the main-signal wavelength components demultiplexed by the wavelength-demultiplexing means into the side of a bit-rate-selective type regenerator as well as conducting the insertion of a signal from the bit-rate-selective type regenerator;

the bit-rate-selective type regenerator for conducting the regenerative repeating to a signal from the optical switch according to the bit rate;

a monitor signal receiver for receiving and terminating the monitor-signal wavelength component demultiplexed by the wavelength-demultiplexing means;

a controller for detecting the bit rate and pass-through node number of each of the main-signal wavelength components by receiving a signal from the monitor signal receiver, generating a control signal to control the switching of the optical switch into the side of the bit-rate-selective type regenerator for the wavelength component signal from the wavelength-demultiplexing means to need the regenerative repeating, and rewriting information to show the bit rate, pass-through node number and execution/non-execution of regenerative repeating of each of the main-signal wavelength components to be output to the next-stage node;

a monitor signal transmitter for generating a monitor-signal wavelength component according to a signal from the controller; and a wavelength-multiplexing means for multiplexing the main-signal wavelength components output from the optical switch and the monitor-signal wavelength component output from the monitor signal transmitter.

According to another aspect of the invention, an optical cross connect type wavelength division multiplexing optical transmission system, comprises:

a wavelength-demultiplexing means for receiving a wavelength-multiplexed signal that a monitor-signal wavelength component is multiplexed to a plurality of main-signal wavelength components from several nodes and demultiplexing the wavelength-multiplexed signal into wavelength components;

an optical switch for outputting the main-signal wavelength components from the wavelength-demultiplexing means to an arbitrary node;

a bit-rate-selective type regenerator for conducting the regenerative repeating to a signal from the optical switch according to the bit rate;

a monitor signal receiver for receiving and terminating the monitor-signal wavelength component demultiplexed by the wavelength-demultiplexing means;

a controller for detecting the bit rate and pass-through node number of each of the main-signal wavelength components by receiving a signal from the monitor signal receiver, generating a control signal to control the switching of the optical switch into the side of the bit-rate-selective type regenerator for the wavelength component signal from the wavelength-demultiplexing means to need the regenerative repeating, and rewriting information to show the bit rate, pass-through node number and execution/non-execution of regenerative repeating of each of the main-signal wavelength components to be output to the next-stage node;

a monitor signal transmitter for generating a monitor-signal wavelength component according to a signal from the controller; and a wavelength-multiplexing means for multiplexing the main-signal wavelength components output from the optical switch and the monitor-signal wavelength component output from the monitor signal transmitter.

According to another aspect of the invention, an optical insertion/separation ADM ring type wavelength division multiplexing optical transmission system, comprises:

a wavelength-demultiplexing means for receiving a wavelength-multiplexed signal that a monitor-signal wavelength component is multiplexed to a plurality of main-signal wavelength components and demultiplexing the wavelength-multiplexed signal into wavelength components;

an optical switch for switching a wavelength component to need the regenerative repeating of the main-signal wavelength components demultiplexed by the wavelength-demultiplexing means into the side of a bit-rate-selective type regenerator as well as conducting the insertion of a signal from the bit-rate-selective type regenerator;

the bit-rate-selective type regenerator for conducting the regenerative repeating to a signal from the optical switch according to the bit rate;

a monitor signal receiver for receiving and terminating the monitor-signal wavelength component demultiplexed by the wavelength-demultiplexing means;

a controller for detecting the bit rate and pass-through node number of each of the main-signal wavelength components by receiving a signal from the monitor signal receiver, generating a control signal to control the switching of the optical switch into the side of the bit-rate-selective type regenerator for the wavelength component signal from the wavelength-demultiplexing means to need the regenerative repeating, and rewriting information to show the bit rate, pass-through node number and execution/non-execution of regenerative repeating of each of the main-signal wavelength components to be output to the next-stage node;

a monitor signal transmitter for generating a monitor-signal wavelength component according to a signal from the controller;

a second optical switch for conducting the separation/insertion of an arbitrary wavelength component from the main-signal wavelength components output from the optical signal; and a wavelength-multiplexing means for multiplexing the main signal wavelength components output from the optical switch and the monitor-signal wavelength component output from the monitor signal transmitter.

According to another aspect of the invention, a wavelength division multiplexing optical transmission system, comprises:

a wavelength-demultiplexing means for receiving a wavelength-multiplexed signal and demultiplexing the wavelength-multiplexed signal into wavelength components;

an optical switch for switching a wavelength component to need the regenerative repeating of the main-signal wavelength components demultiplexed by the wavelength-demultiplexing means into the side of a bit-rate-selective type regenerator as well as conducting the insertion of a signal from the bit-rate-selective type regenerator;

the bit-rate-selective type regenerator for conducting the regenerative repeating to a signal from the optical switch according to the bit rate;

a S/N monitor circuit for receiving the wavelength-multiplexed signal divided by an optical divider, conducting in the lump the S/N measurement of the wavelength components, and detecting a wavelength component with a S/N ratio less than a threshold value;

a controller for generating a control signal to control the switching of the optical switch into the side of the bit-rate-selective type regenerator for the wavelength component signal from the wavelength-demultiplexing means to need the regenerative repeating according to information from the S/N monitor circuit; and a wavelength-multiplexing means for multiplexing the main-signal wavelength components output from the optical switch.

According to another aspect of the invention, a wavelength division multiplexing optical transmission system, comprises:

a wavelength-demultiplexing means for receiving a wavelength-multiplexed signal and demultiplexing the wavelength-multiplexed signal into wavelength components;

an optical switch for switching a wavelength component to need the regenerative repeating of the main-signal wavelength components demultiplexed by the wavelength-demultiplexing means into the side of a bit-rate-selective type regenerator as well as conducting the insertion of a signal from the bit-rate-selective type regenerator;

the bit-rate-selective type regenerator for conducting the regenerative repeating to a signal from the optical switch according to the bit rate;

a S/N monitor circuit for receiving the wavelength-multiplexed signal divided by an optical divider, conducting separately the S/N measurement of the wavelength components, and detecting a wavelength component with a S/N ratio less than a threshold value;

a controller for generating a control signal to control the switching of the optical switch into the side of the bit-rateselective type regenerator for the wavelength component signal from the wavelength-demultiplexing means to need the regenerative repeating according to information from the S/N monitor circuit; and a wavelength-multiplexing means for multiplexing the main-signal wavelength components output from the optical switch.

BRIEF DESCRIPTION OF THE DRAWINGS

The invention will be explained in more detail in conjunction with the appended drawings, wherein.

DESCRIPTION OF THE PREFERRED EMBODIMENTS

Before explaining the preferred embodiments of the invention, the aforementioned conventional WDM optical transmission system will be explained in FIG. 1.

Figure 1:
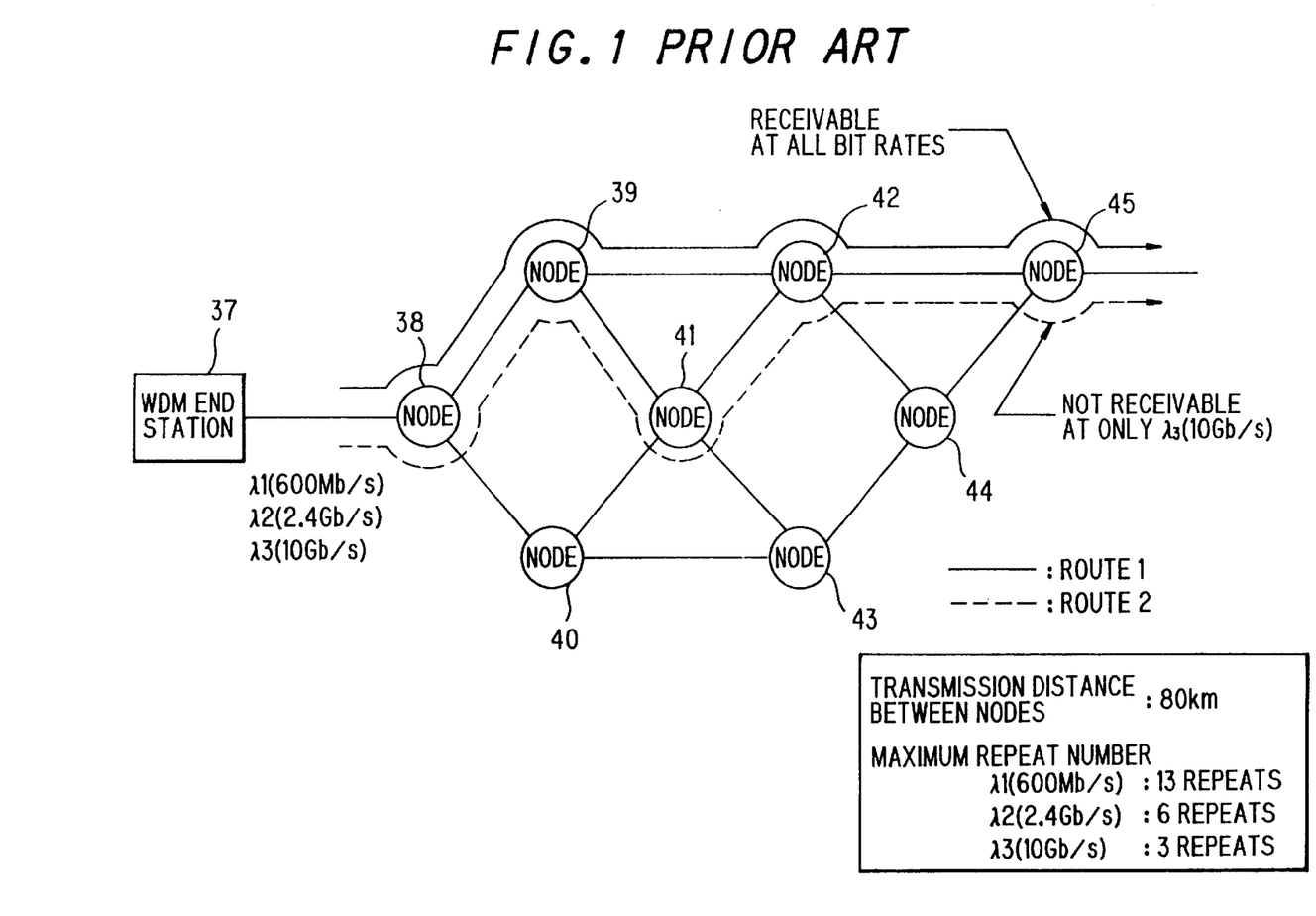
FIG. 1 is a block diagram showing a conventional optical cross connect type WDM optical transmission system.

FIG. 1 is an illustration showing an example of optical cross connect system that a WDM signal to be wavelength-multiplexed at different bit rates is transmitted through two routes, route 1 and route 2. When the node-to-node distance (linear repeating section distance) is 80 km and the maximum repeat numbers are 13 repeats at 600 Mb/s, 6 repeats at 2.4 Gb/s and 3 repeats at 10 Gb/s, a signal with a wavelength of λ3 (10 Gb/s) to be transmitted from a node 38 through route 2 cannot be received at a node 45. Because of this, it needs to conduct regenerative repeating to the signal with a wavelength of λ3(10 Gb/s) to be transmitted from the node 38 through route 2 at a node 42.

Next, a point-to-point type WDM optical transmission system in the first preferred embodiment will be explained in FIG. 7.

Figure 7:
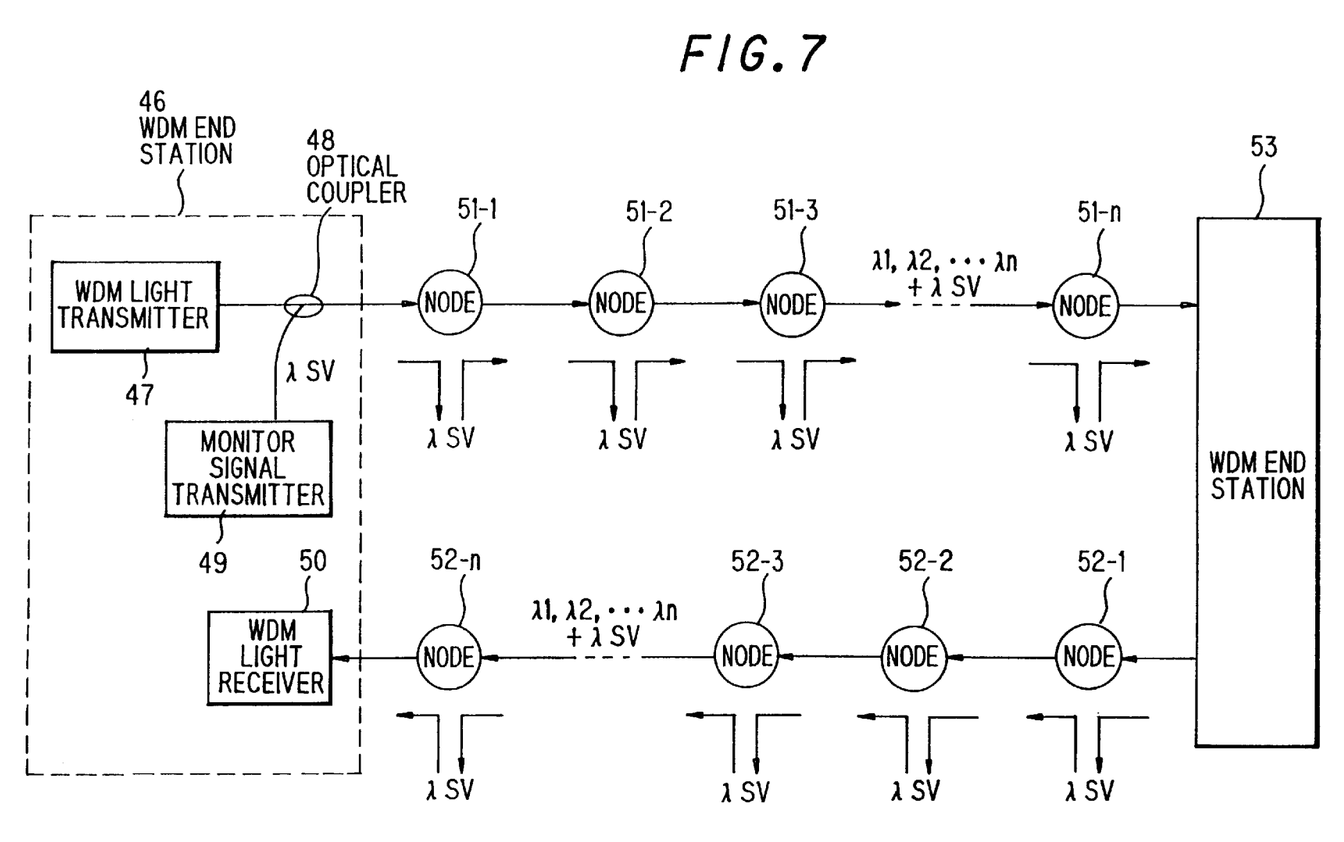
FIG. 7 is a block diagram showing the composition of the point-to-point type WDM optical transmission system in the first preferred embodiment according to the invention.

As shown in FIG. 7, a WDM end station 46 comprises a WDM light transmitter 47 to transmit a main-signal wavelength component, a monitor signal transmitter 49 to generate a monitor signal to carry the bit-rate information of wavelength components (λ1 to λn), an optical coupler 48 to multiplex the main-signal wavelength component and the monitor- signal wavelength component, and a WDM light receiver 50 to receive the main signal. The signal from the WDM end station 46 is transmitted through nodes 51-1 to 51-n. At each node, the separation/insertion of the monitor-signal wavelength component is conducted so that the monitor signal can be always sent to the downstream node.

Figure 2:
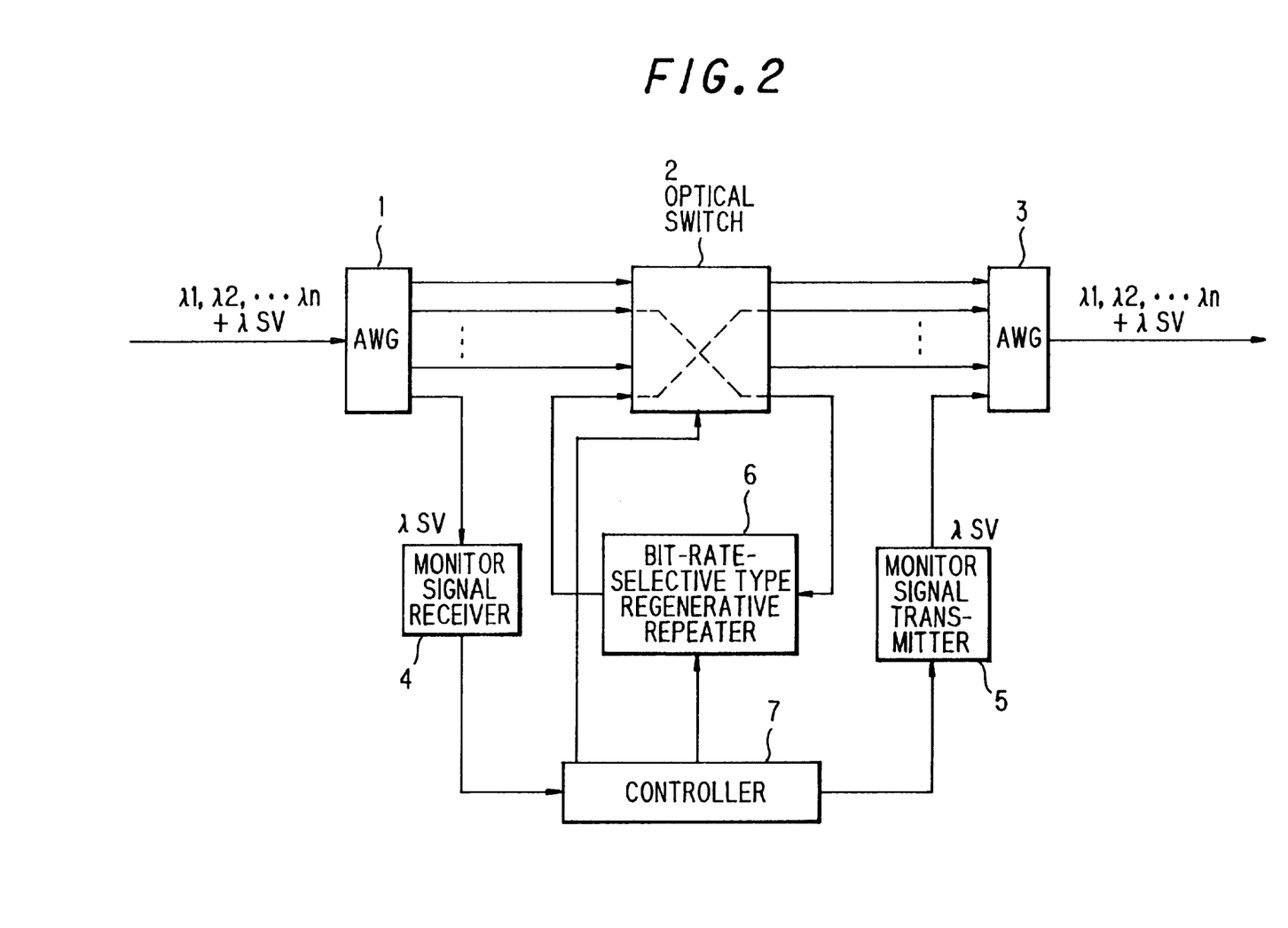
FIG. 2 is a block diagram showing the composition of a node used in a point-to-point type WDM optical transmission system in a first preferred embodiment according to the invention.

FIG. 2 shows the details of each node in this system. A WDM optical signal to be input is wavelength-demultiplexed by an array waveguide grating (hereinafter referred to as 'AWG') 1, then the main-signal wavelength components (λ1 to λn) are output to an optical switch 2 and the monitor-signal wavelength component (λsv) is output to a monitor signal receiver 4. The monitor signal receiver 4 terminates information as to the bit rates of the main-signal wavelength components (λ1 to λn), pass-through node number, execution of regenerative repeating etc. to be carried on the monitor-signal wavelength component (λsv), then outputting it to a controller 7. The controller 7 detects a wavelength component to need the regenerative repeating and its bit rate based upon the information from the monitor signal receiver 4, and outputs a control signal to the optical switch 2 and a bit-rate-selective type regenerator 6.

The optical switch 2 switches the route of the wavelength component to conduct the regenerative repeating into the side of the bit-rate-selective regenerator 6 according to the control signal from the controller 7. The other wavelength components not to need the regenerative repeating are output as they are. The bit-rate-selective regenerator 6 receives the wavelength component signal switched by the optical switch 2, conducting the regenerative repeating according to the bit rate based upon the control signal from the controller 7, then returning the signal to the optical switch 2, outputting the signal with the other wavelength component signals to AWG 3.

Also, the controller 7 writes information to show that the regenerative repeating was conducted at the node concerned into the wavelength component subject to the regenerative repeating, further writing the pass-through node number to show that the other wavelength components pass through the node concerned into the other wavelength components, then outputting them to the monitor signal transmitter 5. The monitor signal transmitter 5 generates the monitor-signal wavelength component (λsv) according to the output signal from the controller 7, outputting it to AWG 3. AWG 3 multiplexes the main-signal wavelength components (λ1 to λn) from the optical switch 2 and the monitor- signal wavelength component (λsv) from the monitor signal transmitter 5, outputting it to the next-stage node.

An optical cross connect type WDM optical transmission system in the second preferred embodiment will be explained in FIG. 8.

Figure 8:
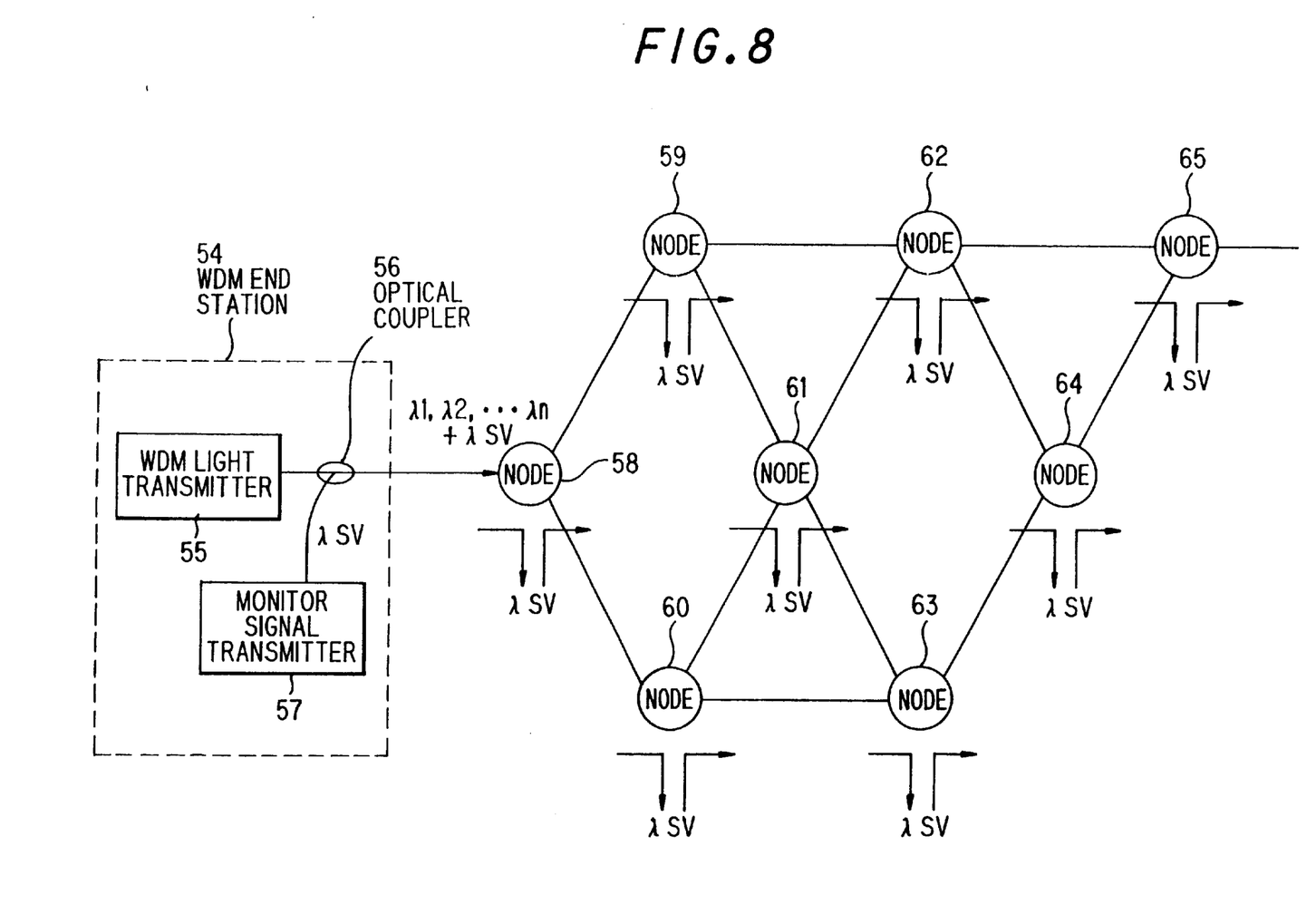
FIG. 8 is a block diagram showing the composition of the optical cross connect type WDM optical transmission system in the second preferred embodiment according to the invention.

As shown in FIG. 8, a WDM end station 54 comprises a WDM light transmitter 55 to transmit a main-signal wavelength component, a monitor signal transmitter 57 to generate a monitor signal to carry the bit-rate information of wavelength components (λ1 to λn), and an optical coupler 48 to multiplex the main-signal wavelength component and the monitor-signal wavelength component. The signal from the WDM end station 54 is transmitted through nodes 58 to 65 while switching arbitrarily the route of each wavelength component. At each node, the separation/insertion of the monitor-signal wavelength component is conducted so that the monitor signal can be always sent to the downstream node.

Figure 3:
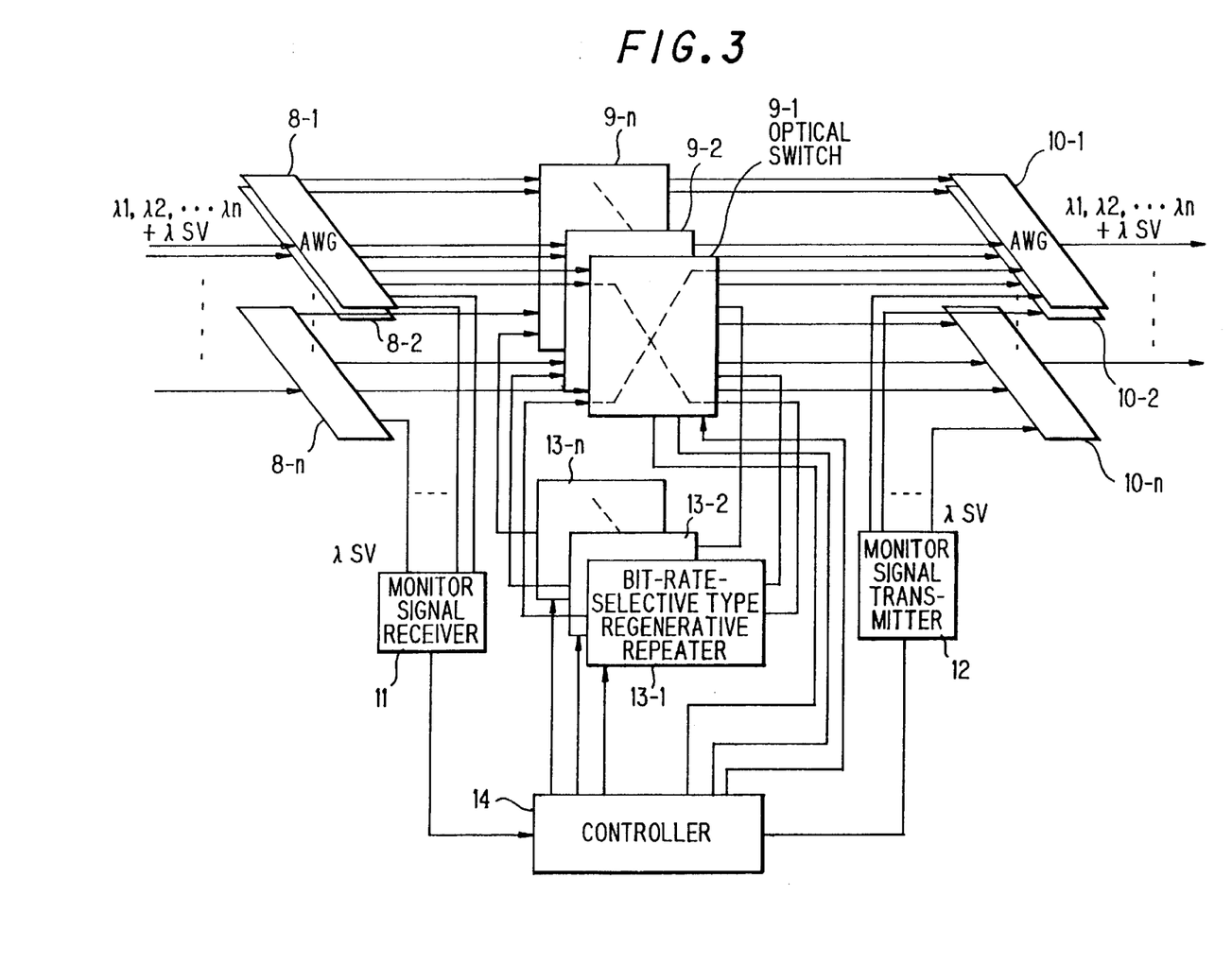
FIG. 3 is a block diagram showing the composition of a node used in an optical cross connect type WDM optical transmission system in a second preferred embodiment according to the invention.

FIG. 3 shows the details of each node in this system. A WDM optical signal to be input is wavelength-demultiplexed by AWGs 8-1 to 8-n, then the main-signal wavelength components (λ1 to λn) are output to optical switches 9-1 to 9-n and the monitor-signal wavelength component (λsv) is output to a monitor signal receiver 11. The monitor signal receiver 11 terminates information as to the bit rates of the main-signal wavelength components (λ1 to λn), pass-through node number, execution of regenerative repeating etc., then outputting it to a controller 14. The controller 14 detects a wavelength component to need the regenerative repeating and its bit rate based upon the information from the monitor signal receiver 11, and outputs a control signal to the optical switches 9-1 to 9-n and bit-rate-selective type regenerators 13-1 to 13-n.

The optical switches 9-1 to 9-n switch the route of the wavelength component to conduct the regenerative repeating into the side of the bit-rate-selective regenerators 13-1 to 13-n according to the control signal from the controller 14. The other wavelength components not to need the regenerative repeating are output while being switched into arbitrary output ports. The bit-rate-selective regenerators 13-1 to 13-n receive the wavelength component signals switched by the optical switches 9-1 to 9-n, conducting the regenerative repeating according to the bit rate based upon the control signal from the controller 14, then returning the signals to the optical switches 9-1 to 9-n, outputting the signals with the other wavelength component signals to AWGs 10-1 to 10-n.

Also, the controller 14 writes information to show that the regenerative repeating was conducted at the node concerned into the wavelength component subject to the regenerative repeating, further writing the pass-through node number to show that the other wavelength components pass through the node concerned into the other wavelength components, then outputting them to the monitor signal transmitter 12. The monitor signal transmitter 12 generates the monitor-signal wavelength component (λsv) according to the output signal from the controller 14, outputting it to AWGs 10-1 to 10-n. AWGs 10-1 to 10-n multiplex the main-signal wavelength components (λ1 to λn) from the optical switches 9-1 to 9-n and the monitor-signal wavelength component (λsv) from the monitor signal transmitter 12, outputting it to the next-stage node.

An optical ADM ring type WDM optical transmission system in the third preferred embodiment will be explained in FIG. 9.

Figure 9:
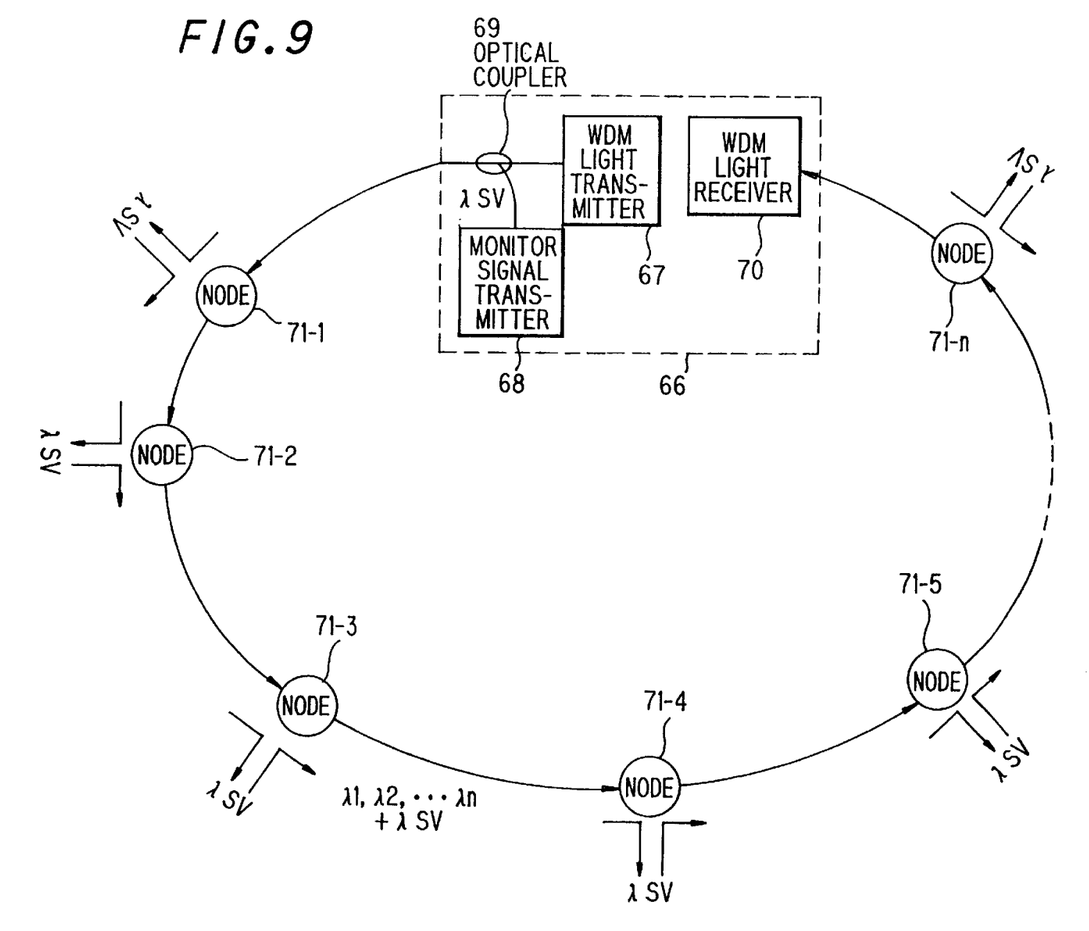
FIG. 9 is a block diagram showing the composition of the optical ADM ring type WDM optical transmission system in the third preferred embodiment according to the invention.

As shown in FIG. 9, a WDM end station 66 comprises a WDM light transmitter 67 to transmit a main-signal wavelength component, a monitor signal transmitter 68 to generate a monitor signal to carry the bit-rate information of wavelength components (λ1 to λn), an optical coupler 69 to multiplex the main-signal wavelength component and the monitor-signal wavelength component, and a WDM light receiver 70 to receive the main signal. The signal from the WDM end station 66 is transmitted while conducting the separation/insertion of an arbitrary wavelength component at nodes 71-1 to 71-n. At each node, the separation/insertion of the monitor-signal wavelength component is conducted so that the monitor signal can be always sent to the downstream node.

Figure 4:
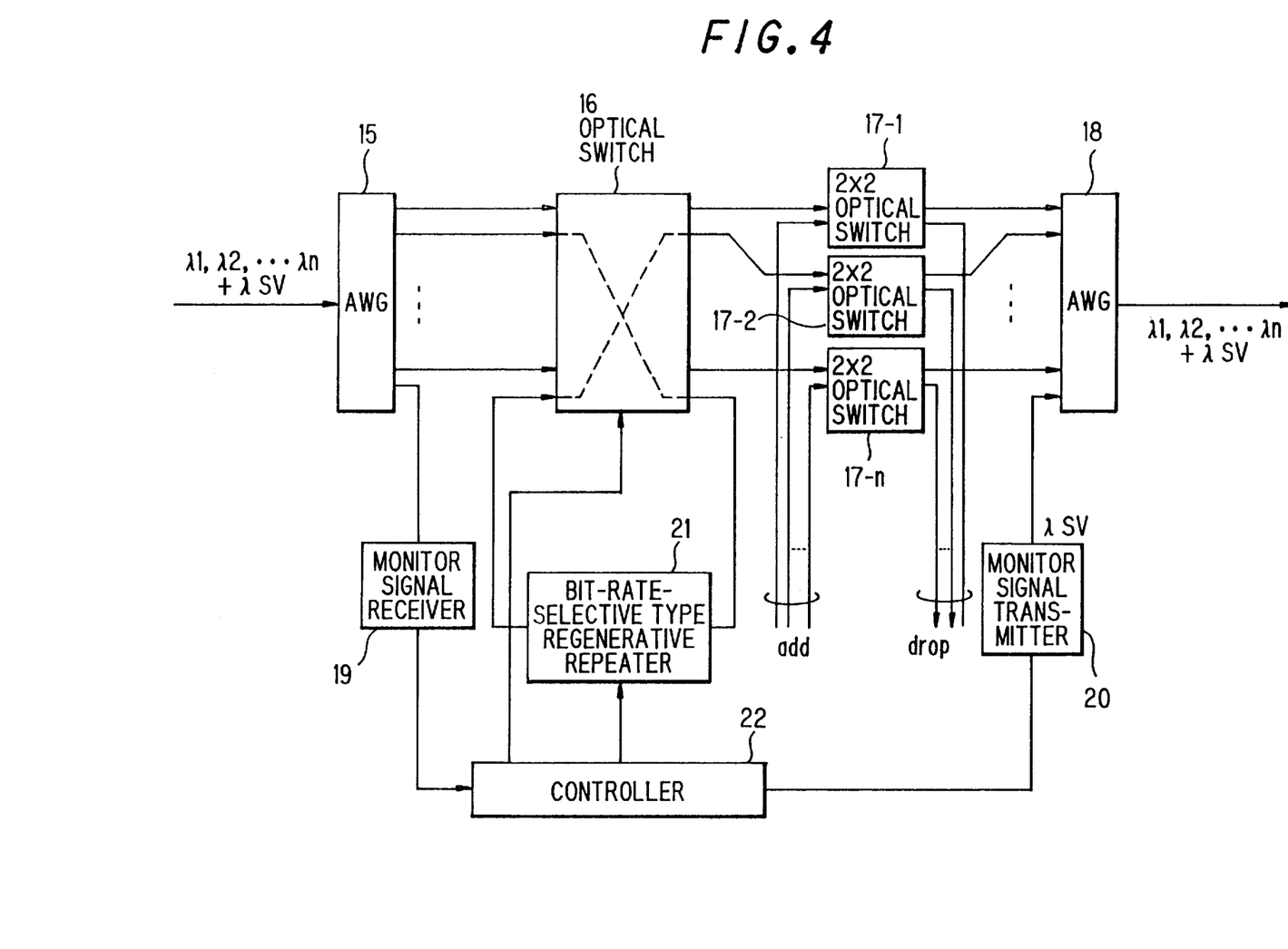
FIG. 4 is a block diagram showing the composition of a node used in an optical ADM ring type WDM optical transmission system in a third preferred embodiment according to the invention.

FIG. 4 shows the details of each node in this system. A WDM optical signal to be input is wavelength-demultiplexed by AWG 15, then the main-signal wavelength components (λ1 to λn) are output to an optical switch 16 and the monitor-signal wavelength component (λsv) is output to a monitor signal receiver 19. The monitor signal receiver 19 terminates information as to the bit rates of the main-signal wavelength components (λ1 to λn), pass-through node number, execution of regenerative repeating etc., then outputting it to a controller 22. The controller 22 detects a wavelength component to need the regenerative repeating and its bit rate based upon the information from the monitor signal receiver 19, and outputs a control signal to the optical switch 16 and a bit-rate-selective type regenerator 21.

The optical switch 16 switches the route of the wavelength component to conduct the regenerative repeating into the side of the bit-rate-selective regenerator 21 according to the control signal from the controller 22. The other wavelength components not to need the regenerative repeating are output as they are. The bit-rate-selective regenerator 21 receives the wavelength component signal switched by the optical switch 16, conducting the regenerative repeating according to the bit rate based upon the control signal from the controller 22, then returning the signal to the optical switch 16, outputting the signal with the other wavelength component signals to optical switches 17-1 to 17-n. Then, the optical switches 17-1 to 17-n conduct the separation/insertion to an arbitrary wavelength component, outputting them to AWG 18.

Also, the controller 22 writes information to show that the regenerative repeating was conducted at the node concerned into the wavelength component subject to the regenerative repeating, further writing the pass-through node number to show that the other wavelength components pass through the node concerned into the other wavelength components, then outputting them to the monitor signal transmitter 20. The monitor signal transmitter 20 generates the monitor-signal wavelength component (λsv) according to the output signal from the controller 22, outputting it to AWG 18. AWG 18 multiplexes the main-signal wavelength components (λ1 to λn) from the optical switch 16 and the monitor-signal wavelength component (λsv) from the monitor signal transmitter 20, outputting it to the next-stage node.

Figure 5:
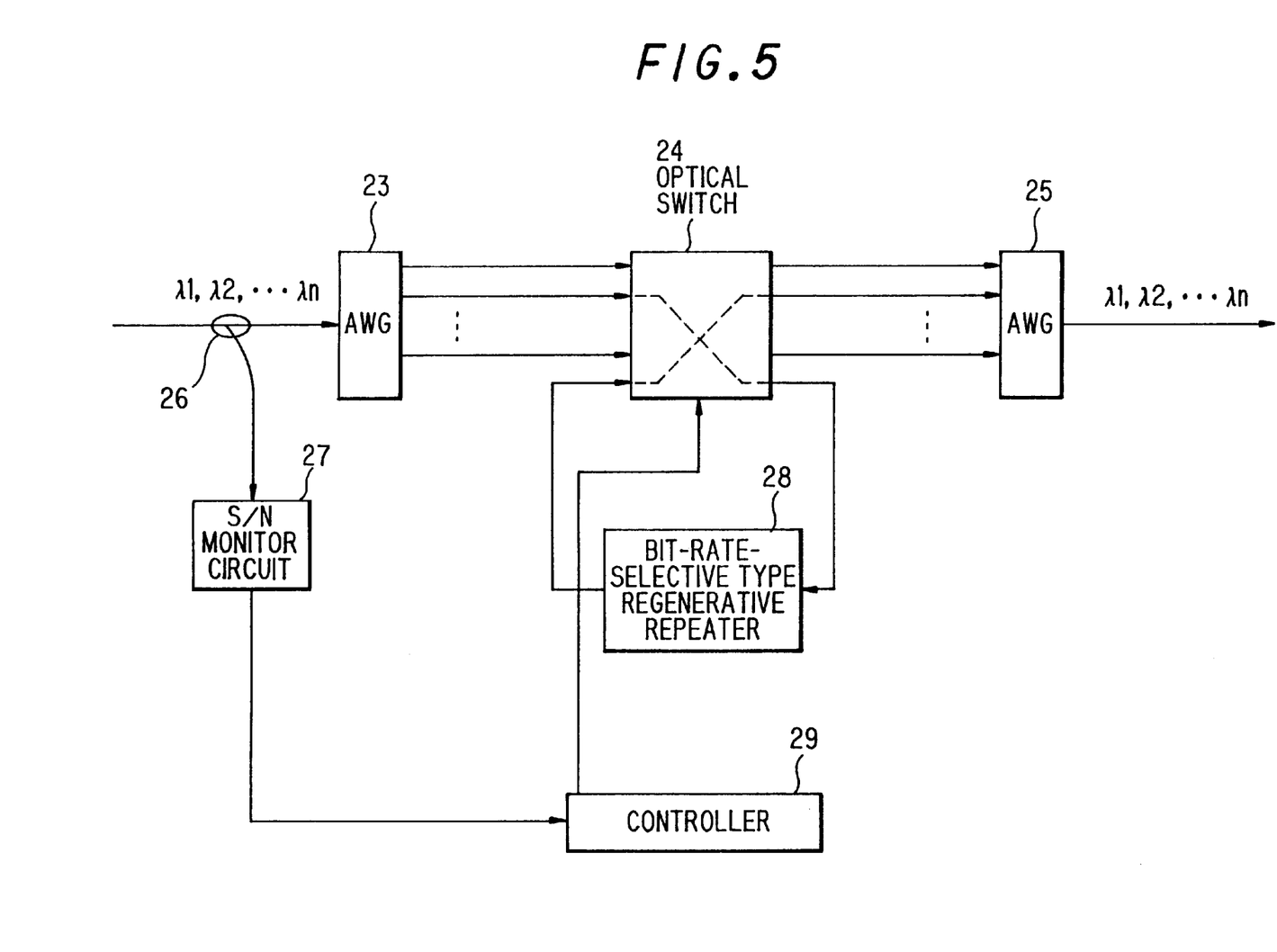
FIG. 5 is a block diagram showing the composition of a node used in a WDM optical transmission system in a fourth preferred embodiment according to the invention.

A WDM optical transmission system in the fourth preferred embodiment will be explained will be explained in FIG. 5. In FIG. 5, a node applicable to point-to-point system, optical cross connect system, optical ADM ring system etc. in the fourth embodiment is shown.

As shown in FIG. 5, a WDM optical signal is received by the node, divided by an optical divider 26. Thus, one is output to AWG 23 and the other is output to a S/N monitor circuit 27.

The WDM signal input to AWG 23 is wavelength-demultiplexed into wavelength components (λ1 to λn), sent to an optical switch 24. On the other hand, the S/N monitor circuit 27 measures in the lump the ratio of signal level to spontaneous emission light (ASE) for each of the main-signal wavelength components (λ1 to λn) in the WDM optical signal input, outputting information as to the measured S/N ratios to a controller 29. The controller 29 detects a wavelength component with a S/N ratio less than a threshold value base upon the signal from the S/N monitor circuit 27, judging that the wavelength component has the deteriorated S/N ratio and therefore it needs to be subject to the regenerative repeating, then outputting a control signal to conduct the regenerative repeating to the optical switch 24.

The optical switch 24 switches the route of the wavelength component to conduct the regenerative repeating into the side of a bit-rate-selective regenerator 28 according to the control signal from the controller 29. The other wavelength components not to need the regenerative repeating are output as they are. The bit-rate-selective regenerator 28 receives the wavelength component signal switched by the optical switch 24, conducting the regenerative repeating while detecting the bit rate of the received signal. Then, the wavelength component subject to the regenerative repeating is returned to the optical switch 24, then output with the other wavelength component not subject to the regenerative repeating to AWG 25. Then, AWG 25 multiplexes the main-signal wavelength components output from the optical switch 24, outputting it to the next-stage node.

Figure 6:
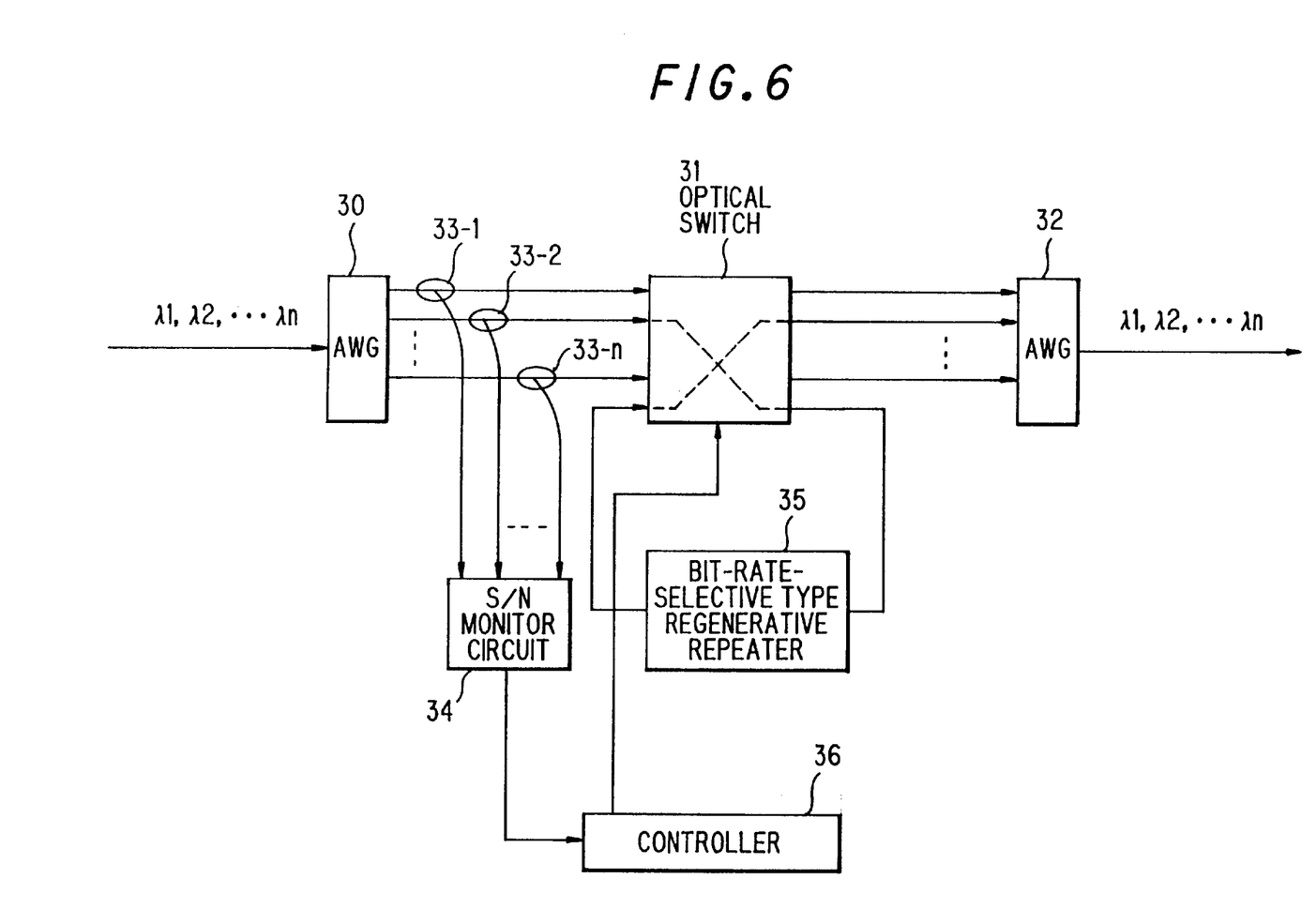
FIG. 6 is a block diagram showing the composition of a node used in a WDM optical transmission system in a fifth preferred embodiment according to the invention.

A WDM optical transmission system in the fifth preferred embodiment will be explained will be explained in FIG. 6. In FIG. 6, a node applicable to point-to-point system, optical cross connect system, optical ADM ring system etc. in the fifth embodiment is shown. As shown in FIG. 6, a WDM optical signal is received by the node, input to AWG 30, demultiplexed. Then, the demultiplexed wavelength components are divided by optical dividers 33-1 to 33-n, thereby one is output to an optical switch 31 and the other is output to a S/N monitor circuit 34.

The S/N monitor circuit 34 measures separately the ratio of signal level to spontaneous emission light (ASE) for each of the main-signal wavelength components ($\lambda 1$ to $\lambda n$), outputting it to a controller 36. The controller 36 compares each of the signals from the S/N monitor circuit 34 with a threshold value, and, to a wavelength component with a S/N ratio less than a threshold value, judging that the wavelength component has the deteriorated S/N ratio and therefore it needs to be subject to the regenerative repeating, then outputting a control signal to conduct the regenerative repeating to the optical switch 31.

The optical switch 31 switches the route of the wavelength component to conduct the regenerative repeating into the side of a bit-rate-selective regenerator 35 according to the control signal from the controller 36. The other wavelength components not to need the regenerative repeating are output as they are. The bit-rate-selective regenerator 35 receives the wavelength component signal switched by the optical switch 31, conducting the regenerative repeating while detecting the bit rate of the received signal. Then, the wavelength component subject to the regenerative repeating is returned to the optical switch 31, then output with the other wavelength component not subject to the regenerative repeating to AWG 32. Then, AWG 32 multiplexes the main-signal wavelength components output from the optical switch 31, outputting it to the next-stage node.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A wavelength division multiplexing optical transmission system, comprising:
   a wavelength-demultiplexing means for receiving a wavelength-multiplexed signal that a monitor-signal wavelength component is multiplexed to a plurality of main-signal wavelength components and demultiplexing said wavelength-multiplexed signal into wavelength components;
   an optical switch for receiving said main-signal wavelength components demultiplexed by said wavelength-demultiplexing means and switching into either one of routes to output directly and to output through a bit-rate-selective type regenerator for each of said main-signal wavelength components;
   said bit-rate-selective type regenerator for conducting the regenerative repeating to a signal input through said optical switch according to the bit rate and then returning it to said optical switch;
   a monitor signal receiver for receiving and terminating said monitor-signal wavelength component demultiplexed by said wavelength-demultiplexing means;
   a controller for detecting the bit rate and pass-through node number of each of said main-signal wavelength components by receiving a signal from said monitor signal receiver, generating a control signal to control the switching of said optical switch and the regenerative repeating of said bit-rate-selective type regenerator, and rewriting information to show the bit rate, pass-through node number and execution/non-execution of regenerative repeating of each of said main-signal wavelength components to be output to the next-stage node;
   a monitor signal transmitter for receiving said information rewritten by said controller and generating a monitor-signal wavelength component; and
   a wavelength-multiplexing means for multiplexing said main-signal wavelength components output from said optical switch and said monitor-signal wavelength component output from said monitor signal transmitter.

2. A point-to-point type wavelength division multiplexing optical transmission system, comprising:
   a wavelength-demultiplexing means for receiving a wavelength-multiplexed signal that a monitor-signal wavelength component is multiplexed to a plurality of main-signal wavelength components and demultiplexing said wavelength-multiplexed signal into wavelength components;
   an optical switch for switching a wavelength component to need the regenerative repeating of said main-signal wavelength components demultiplexed by said wavelength-demultiplexing means into the side of a bit-rate-selective type regenerator as well as conducting the insertion of a signal from said bit-rate-selective type regenerator;
   said bit-rate-selective type regenerator for conducting the regenerative repeating to a signal from said optical switch according to the bit rate;
   a monitor signal receiver for receiving and terminating said monitor-signal wavelength component demultiplexed by said wavelength-demultiplexing means;
   a controller for detecting the bit rate and pass-through node number of each of said main-signal wavelength components by receiving a signal from said monitor signal receiver, generating a control signal to control the switching of said optical switch into the side of said bit-rate-selective type regenerator for said wavelength component signal from said wavelength-demultiplexing means to need the regenerative repeating, and rewriting information to show the bit rate, pass-through node number and execution/non-execution of regenerative repeating of each of said main-signal wavelength components to be output to the next-stage node;
   a monitor signal transmitter for generating a monitor-signal wavelength component according to a signal from said controller; and
   a wavelength-multiplexing means for multiplexing said main-signal wavelength components output from said optical switch and said monitor-signal wavelength component output from said monitor signal transmitter.

3. An optical insertion/separation ADM ring type wavelength division multiplexing optical transmission system, comprising:

a wavelength-demultiplexing means for receiving a wavelength-multiplexed signal that a monitor-signal wavelength component is multiplexed to a plurality of main-signal wavelength components and demultiplexing said wavelength-multiplexed signal into wavelength components;

an optical switch for switching a wavelength component to need the regenerative repeating of said main-signal wavelength components demultiplexed by said wavelength-demultiplexing means into the side of a bit-rate-selective type regenerator as well as conducting the insertion of a signal from said bit-rate-selective type regenerator;

said bit-rate-selective type regenerator for conducting the regenerative repeating to a signal from said optical switch according to the bit rate;

a monitor signal receiver for receiving and terminating said monitor-signal wavelength component demultiplexed by said wavelength-demultiplexing means;

a controller for detecting the bit rate and pass-through node number of each of said main-signal wavelength components by receiving a signal from said monitor signal receiver, generating a control signal to control the switching of said optical switch into the side of said bit-rate-selective type regenerator for said wavelength component signal from said wavelength-demultiplexing means to need the regenerative repeating, and rewriting information to show the bit rate, pass-through node number and execution/non-execution of regenerative repeating of each of said main-signal wavelength components to be output to the next-stage node;

a monitor signal transmitter for generating a monitor-signal wavelength component according to a signal from said controller;

a second optical switch for conducting the separation/insertion of an arbitrary wavelength component from said main-signal wavelength components output from said optical signal; and a wavelength-multiplexing means for multiplexing said main-signal wavelength components output from said optical switch and said monitor-signal wavelength component output from said monitor signal transmitter.

4. A wavelength division multiplexing optical transmission system, comprising:

a wavelength-demultiplexing means for receiving a wavelength-multiplexed signal and demultiplexing said wavelength-multiplexed signal into wavelength components;

an optical switch for switching a wavelength component to need the regenerative repeating of said main-signal wavelength components demultiplexed by said wavelength-demultiplexing means into the side of a bit-rate-selective type regenerator as well as conducting the insertion of a signal from said bit-rate-selective type regenerator;

said bit-rate-selective type regenerator for conducting the regenerative repeating to a signal from said optical switch according to the bit rate;

a S/N monitor circuit for receiving said wavelength-multiplexed signal divided by an optical divider, conducting in the lump the S/N measurement of said wavelength components, and detecting a wavelength component with a S/N ratio less than a threshold value;

a controller for generating a control signal to control the switching of said optical switch into the side of said bit-rate-selective type regenerator for said wavelength component signal from said wavelength-demultiplexing means to need the regenerative repeating according to information from said S/N monitor circuit; and a wavelength-multiplexing means for multiplexing said main-signal wavelength components output from said optical switch.

5. A wavelength division multiplexing optical transmission system, according to claim 4, wherein:

said system is of point-to-point type, optical cross connect type or optical ADM ring type.

6. A wavelength division multiplexing optical transmission system, comprising:

a wavelength-demultiplexing means for receiving a wavelength-multiplexed signal and demultiplexing said wavelength-multiplexed signal into wavelength components;

an optical switch for switching a wavelength component to need the regenerative repeating of said main-signal wavelength components demultiplexed by said wavelength-demultiplexing means into the side of a bit-rate-selective type regenerator as well as conducting the insertion of a signal from said bit-rate-selective type regenerator;

said bit-rate-selective type regenerator for conducting the regenerative repeating to a signal from said optical switch according to the bit rate;

a S/N monitor circuit for receiving said wavelength-multiplexed signal divided by an optical divider, conducting separately the S/N measurement of said wavelength components, and detecting a wavelength component with a S/N ratio less than a threshold value;

a controller for generating a control signal to control the switching of said optical switch into the side of said bit-rate-selective type regenerator for said wavelength component signal from said wavelength-demultiplexing means to need the regenerative repeating according to information from said S/N monitor circuit; and a wavelength-multiplexing means for multiplexing said main-signal wavelength components output from said optical switch.

7. A wavelength division multiplexing optical transmission system, according to claim 6, wherein:

said system is of point-to-point type, optical cross connect type or optical ADM ring type.

* * * * *